D. D. TRACY.
SECTIONAL CONDUIT.
APPLICATION FILED APR. 4, 1912.
1,092,311.
Patented Apr. 7, 1914.
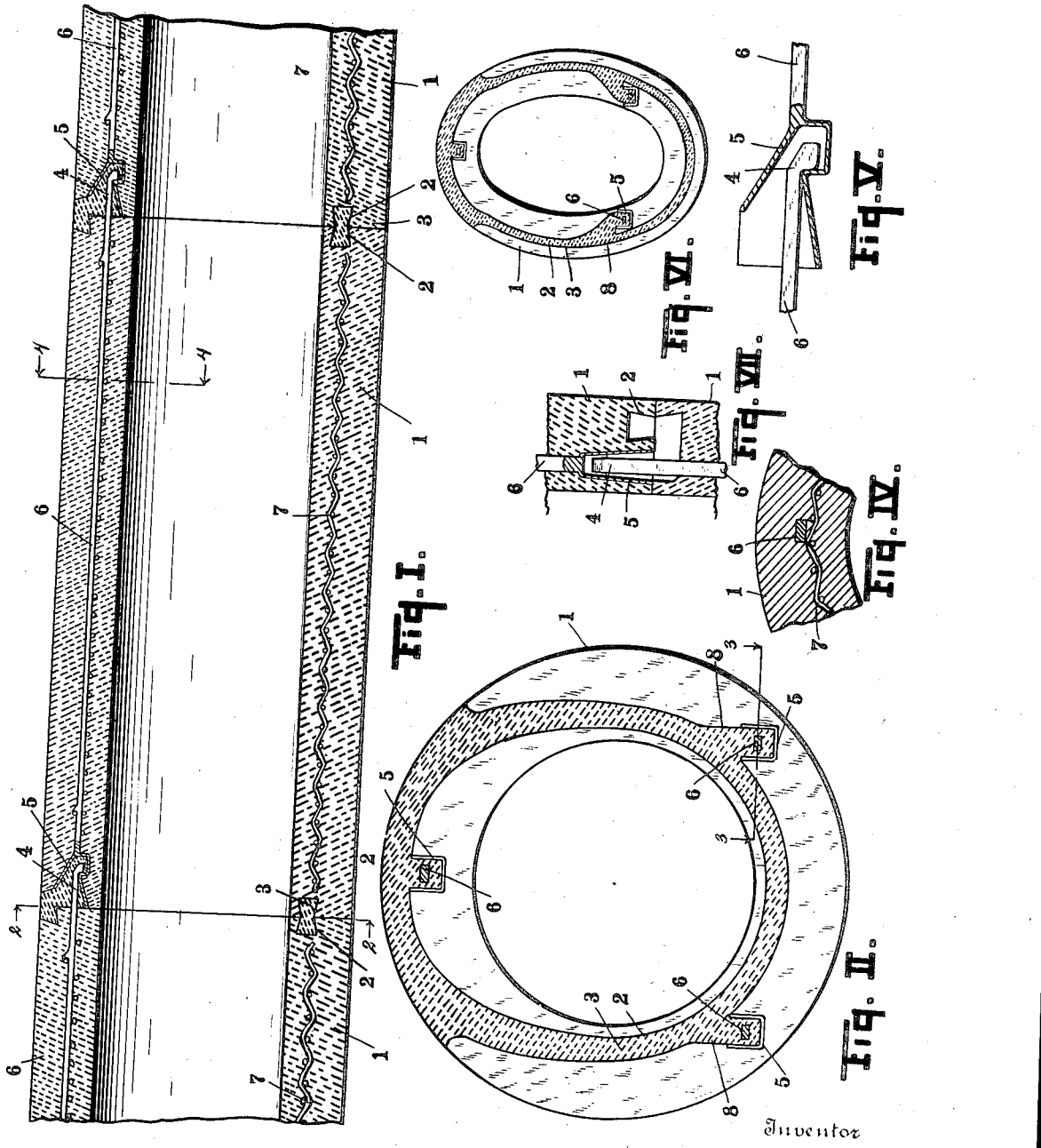
Witnesses
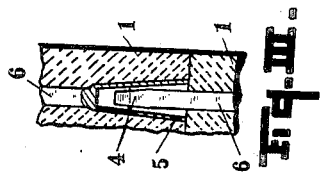
Inventor
David D. Tracy
By Chappell & Earl
Attorneys

UNITED STATES PATENT OFFICE.

DAVID D. TRACY, OF JACKSON, MICHIGAN, ASSIGNOR OF ONE-HALF TO JOHN H. CASEY, OF JACKSON, MICHIGAN.

SECTIONAL CONDUIT.

1,092,311. Specification of Letters Patent. Patented Apr. 7, 1914.

Application filed April 4, 1912. Serial No. 688,446.

*To all whom it may concern:*

Be it known that I, DAVID D. TRACY, a citizen of the United States, residing at the city of Jackson, county of Jackson, and State of Michigan, have invented certain new and useful Improvements in Sectional Conduits, of which the following is a specification.

This invention relates to improvements in sectional conduits.

My improvements relate particularly to joints for sectional conduits and are especially designed by me for use or embodiment in concrete sewer or water or other like pipes or conduits of large dimensions, although they are desirable for use and can be readily embodied in conduits of various sizes and intended for various purposes.

The main objects of this invention are,—first, to provide an improved joint for sectional pipes or conduits which is very secure and may be easily formed to be water and gas tight. Second, to provide an improved joint embodying these advantages which is very simple and enables the joining of the sections as they are laid, the joints being quickly and easily made. Third, to provide an improved sectional conduit in which the sections are joined so that they are capable of withstanding heavy strain.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail central longitudinal section of a conduit embodying the features of my invention, one complete section and parts of two adjacent sections being shown. Fig. II is a transverse section taken on a line corresponding to line 2—2 of Fig. I. Fig. III is a detail horizontal section taken on a line corresponding to line 3—3 of Fig. II, the joint filling being omitted, the coupling member 4 being shown in full lines. Fig. IV is a detail transverse section on line 4—4 of Fig. I showing the arrangement of the reinforce and the coupling rods 6. Fig. V is a detail of the coupling members, the female member being in longitudinal section. Fig. VI is a cross section corresponding to Fig. II of a modified structure, the conduit shown being oval and all of the coupling members being arranged on the inside of the joint channel instead of on the outer side thereof, as shown in Fig. II. Fig. VII is a detail section of another modified construction in which the openings connecting the female coupling members or sockets with the channel is in the end of the section provided with the male coupling members instead of in the end of the section having the female coupling members as shown in the other figures.

In the drawing, similar reference characters refer to similar parts throughout the several views, and the sectional views are taken looking in the direction of the little arrows at the ends of the section lines.

In the accompanying drawing, I have not attempted to maintain the relative proportion of the parts which might be desirable in practice,—that is, the thickness of the pipe walls relative to their dimensions, and further, these are varied under different conditions.

The conduit sections 1 are provided with opposed grooves 2 in their ends which when the sections are brought end to end to abut as shown in Fig. I, provide channels at the joints. The grooves 2 are preferably dovetailed in cross section, the channel formed thereby when the grooves are thus dovetailed being double dove-tailed. The outer walls of the grooves are preferably omitted at the top of the sections, see Fig. II, particularly where the conduit is of considerable diameter. Thus arranged with the sections abutting, I secure a closed segmental joint channel for the lower part of the joint and an open segmental joint channel for the upper part of the joint, the open and the closed channels supplementing each other to completely encircle the joint. The sections are arranged end to end or abutting and the channels filled with cement 3 to completely seal the joints and join the sections. The ends of the sections are flat,—that is, the planes of the ends of the sections are substantially at right angles to a longitudinal plane therethrough. This is of great advantage in laying the sections as will appear as the description proceeds.

The sections are provided with latch-like male coupling members 4 at one end and socket-like female or keeper coupling members 5 adapted to receive the members 4 on the adjacent sections at the other end. These coupling members 4 and 5 are preferably joined to rods 6 arranged longitudinally of the conduit sections and embedded therein. The rods 6 are preferably secured to the reinforce members 7 which in the structure illustrated, are of woven wire. The coupling members 4 all face downwardly and the members 5 are flared outwardly and upwardly so that the coupling members may be joined by a downward and forward swing of the sections. This is of great advantage as it substantially obviates the necessity for both longitudinal and rotary movement of the sections as they are laid,—that is, the sections may be easily swung to position as with a crane. When it is considered that these sections frequently are several feet in diameter and weigh several tons, the advantage of this is readily apparent. Where the conduits are oval as shown in Fig. VI it is of particular advantage to be able to place them without any rotative movement. The coupling members guide the sections so that they are always properly positioned.

The socket or female coupling members open into the joint channels through the opening 8 which in the preferred construction opens into the top of the channels so that the filling readily flows into the socket to embed the male members therein as the joints are filled. The coupling members opening into the open portions of the channel are preferably arranged on the inside of the channel while those opening into the closed portion of the channel are preferably arranged on the outside of the channel,—see Fig. II. Thus arranged, they are out of alinement with the channels so that the channels are unobstructed. This permits the cleaning out of the channel after the sections are laid before an attempt is made to introduce the cement thereto. This is of very great advantage in working conditions should the joint become filled or clogged in getting the sections in place, with such as thin mud, quicksand and even dry sand or dirt. It can be readily swabbed out preparatory to filling with cement, making the joint as good as the body of the pipe. The arranging of the channel grooves as shown in Figs. I and II, locates the closed part of the channel as near the inside of the conduit as is possible and the open portion to the outside. The closed portion of the joint being open at the top of the conduit, the joint cement or filling can be poured or forced into the joint while the conduit is resting upon the ground or in a ditch or the like, even when partially embedded.

The open grooved top, can, of course, be filled with a trowel or the like. This is of very great advantage as it enables the work to be done quickly and the joint to be sealed from the outside of the joint and above the conduit.

It will be obvious that when the male and female coupling members of the sections are joined as by the rod 6, the coupling members of the conduit are secured in one continuous length, and a continuous reinforce as well as coupling is provided. While this feature is of advantage, there are many conditions in which the conduit is satisfactory without it.

The joints of my improved sectional conduit are very secure and very easily formed, even where the conduit is of large diameter. The joint may be conveniently formed as the sections are laid one at a time and brought end to end to engage the coupling members, and owing to the arrangement of the coupling members, the sections are readily swung to position.

The joint is effectively sealed by filling the channels with cement and this also serves to unite and connect the sections, particularly where dove-tailed channels or grooves are used. The dove-tailed channels, however, are not essential as a satisfactory conduit is produced where straight channels are provided.

I have illustrated and described my improvements in a simple and effective embodiment. I have not attempted to describe or illustrate the various modifications which may be possible without departing from my invention, but I wish to be understood as claiming the same specifically in the form illustrated as well as broadly within the scope of the appended claims.

Having thus described my invention, what I claim is new and desire to secure by Letters Patent is:

1. A sectional conduit comprising abutting tubular sections having opposed facing grooves in their abutting ends, the outer walls of the grooves being omitted at the top of the sections, said grooves coacting to provide a closed segmental channel for the lower part of the joint, the ends of the sections being in planes substantially at right angles to their longitudinal planes, male coupling members having downwardly facing engaging hooks at their ends, upwardly flared female coupling members having upwardly facing keeper portions at their inner ends coacting with the hook portions of said male coupling members, the coupling members embraced by the open portion of the channel being disposed at the inner sides of the grooves, and those embraced by the closed portion of the channel being disposed at the outer side of the grooves so that the closed channel of the joint is unobstructed when the sections are brought to position, the sections containing the female coupling members being provided with openings from the groove into the tops of such members, and a cement filling for said grooves and said female coupling members embedding the said male coupling members.

2. A sectional conduit comprising abutting tubular sections having opposed facing grooves in their abutting ends, the outer walls of the grooves being omitted at the top of the sections, said grooves coacting to provide a closed segmental channel for the lower part of the joint, the ends of the sections being in planes substantially at right angles to their longitudinal planes, male coupling members having downwardly facing engaging hooks at their ends, upwardly flared female coupling members having upwardly facing keeper portions at their inner ends coacting with the hook portions of said male coupling members, the coupling members embraced by the open portion of the channel being disposed at the inner sides of the grooves, and those embraced by the closed portion of the channel being disposed at the outer side of the grooves so that the closed channel of the joint is unobstructed when the sections are brought to position, and a cement filling for said grooves and said female coupling members embedding the said male coupling members.

3. A sectional conduit comprising abutting tubular sections having opposed facing grooves in their abutting ends, the outer walls of the grooves being omitted at the top of the sections, said grooves coacting to provide a closed segmental channel for the lower part of the joint, the ends of the sections being in planes substantially at right angles to their longitudinal planes, male coupling members having downwardly facing engaging hooks, upwardly flared female coupling members having upwardly facing keeper portions coacting with the hook portions of said male coupling members, and a cement filling for said grooves and said female coupling members embedding the said male coupling members.

4. A sectional conduit comprising abutting tubular sections having opposed facing grooves in their abutting ends, the outer walls of the grooves being omitted at the top of the sections, said grooves coacting to provide a closed segmental channel for the lower part of the joint, the ends of the sections being in planes substantially at right angles to their longitudinal planes, male coupling members having downwardly facing engaging hooks, female coupling members having upwardly facing keeper portions at their inner ends coacting with the hook portions of said male coupling members, said coupling members being disposed at the sides of the grooves so that the closed channel of the joint is unobstructed when the sections are brought to position, there being openings from the channel to the female coupling members, and a cement filling for said grooves and said female coupling members embedding the said male coupling members.

5. A sectional conduit comprising abutting tubular sections having opposed facing grooves in their abutting ends, the outer walls of the grooves being omitted at the top of the sections, said grooves coacting to provide a closed segmental channel for the lower part of the joint, the ends of the sections being in planes substantially at right angles to their longitudinal planes, male coupling members having downwardly facing engaging hooks, female coupling members having upwardly facing keeper portions at their inner ends coacting with the hook portions of said male coupling members, said coupling members being disposed at the sides of the grooves so that the closed channel of the joint is unobstructed when the sections are brought to position, and a cement filling for said grooves.

6. A sectional conduit comprising abutting tubular sections having opposed facing grooves in their abutting ends, the outer walls of the grooves being omitted at the top of the sections, said grooves coacting to provide a closed segmental channel for the lower part of the joint, the ends of the sections being in planes substantially at right angles to their longitudinal planes, male coupling members having downwardly facing engaging hooks, female coupling members having upwardly facing keeper portions at their inner ends coacting with the hook portions of said male coupling members, and a cement filling for said grooves.

7. A sectional conduit comprising abutting tubular sections having opposed facing grooves in their abutting ends, the outer walls of the grooves being omitted at the top of the sections, said grooves coacting to provide a closed segmental channel for the lower part of the joint, the ends of the sections being in planes substantially at right angles to their longitudinal planes, male coupling members, coacting female coupling members, said coupling members being disposed at the sides of the grooves so that the closed channel of the joint is unobstructed when the sections are brought to position, there being openings from the channel to the female coupling members, and a cement filling for said grooves and said female coupling members embedding the said male coupling members.

8. A sectional conduit comprising abutting tubular sections having opposed facing grooves in their abutting ends, the outer walls of the grooves being omitted at the top of the sections, said grooves coacting to provide a closed segmental channel for the lower part of the joint, the ends of the sections being in planes substantially at right angles to their longitudinal planes, male coupling members, coacting female coupling members, said coupling members being disposed at the sides of the grooves so that the closed channel of the joint is unobstructed when the sections are brought to position, and a cement filling for said grooves.

9. A sectional conduit comprising tubular sections having abutting ends with registering grooves therein, the inner walls of the grooves being continuous around the sections and their edges abutting throughout, the outer walls of the grooves embracing the lower part of the joint being edge to edge, whereby an unobstructed closed channel is provided for the lower part of the joint entirely closed to the inside of the conduit, parts of the outer walls of the grooves at the top of the sections being omitted to provide exterior openings at the end of said closed channel through which it may be filled.

10. A sectional conduit comprising tubular sections having flat abutting ends with registering grooves therein, the edges of the inner and outer walls of the grooves being in the plane of the ends of the sections to provide a closed channel at the joints, parts of the outer walls of the grooves being omitted to provide openings at the ends of the closed channel through which the channel may be filled from the outside of the conduit, and a cement filling for said channel.

11. A sectional conduit comprising abutting tubular sections having flat ends with registering grooves, the edges of the inner and outer walls of the grooves abutting to provide a closed channel embracing the lower portion of the joint, a portion of the outer walls of the grooves at the top of the sections being omitted to provide an open channel at the top of the sections constituting a continuation of the closed channel whereby both the open and closed channels may be filled from the outside of the conduit.

12. A sectional conduit comprising tubular sections having abutting ends with registering grooves therein, the edges of the inner and outer walls of the grooves embracing the lower part of the joint being edge to edge to provide an unobstructed closed channel at the lower part of the joint, parts of the outer walls of the grooves being omitted to provide exterior openings through which the closed channel may be filled from the outside of the conduit.

13. A sectional conduit comprising abutting tubular sections having registering grooves, the edges of the inner and outer walls of the grooves abutting to provide a closed channel embracing the lower portion of the joint, a portion of the outer walls of the grooves at the top of the sections being omitted to provide an open channel at the top of the sections into which the closed channel opens, whereby both the open and closed channels may be filled from the outside of the conduit.

In witness whereof, I have hereunto set my hand and seal in the presence of two witnesses.

DAVID D. TRACY. [L. S.]

Witnesses:
  JNO. H. CASEY,
  HARRY VANDERCOOK.